(12) United States Patent
Picard et al.

(10) Patent No.: US 6,404,941 B1
(45) Date of Patent: Jun. 11, 2002

(54) OPTICAL MULTIPLE CIRCUIT BREAKER

(75) Inventors: Antoni Picard, Eltville; Jens Schulze, Mainz; Michel Neumeier, Mandelbachtal, all of (DE)

(73) Assignee: Institut fur Mikrotechnik Mainz GmbH, Mainz (DE)

( * ) Notice: Subject to any disclaimer, the term of this patent is extended or adjusted under 35 U.S.C. 154(b) by 0 days.

(21) Appl. No.: 09/381,445

(22) PCT Filed: Mar. 20, 1998

(86) PCT No.: PCT/EP98/01643

§ 371 (c)(1),
(2), (4) Date: Sep. 20, 1999

(87) PCT Pub. No.: WO98/43125

PCT Pub. Date: Oct. 1, 1998

(30) Foreign Application Priority Data

Mar. 20, 1997 (DE) .......................................... 197 11 559

(51) Int. Cl.[7] ................................................. G02B 6/35
(52) U.S. Cl. .............................. 385/18; 385/17; 385/20
(58) Field of Search .......................... 385/16–18, 20–22

(56) References Cited

U.S. PATENT DOCUMENTS 4,121,884 A * 10/1978 Greenwood .................. 385/16
4,245,886 A    1/1981 Kolodzey ..................... 385/19
6,154,586 A * 11/2000 MacDonald et al. .......... 385/18

FOREIGN PATENT DOCUMENTS

| DE | 36 08 135 A1 | * | 9/1987 |
| FR | 2 602 595 | | 2/1988 |
| GB | 1 494 150 | | 12/1997 |

OTHER PUBLICATIONS

IEEE Transactions on Components, Packaging, and Manufacturing Technology—Part B, vol. 1B, No. 2, May 1995, pp. 241–244.
Patent Abstracts of Japan—vol. 016, No. 427 (P–1416), Sep. 8, 1992 and JP 04 146402 A (Hitachi), May 20, 1992.

* cited by examiner

*Primary Examiner*—Brian Healy
*Assistant Examiner*—Sarah U Song
(74) *Attorney, Agent, or Firm*—Daniel J. Hudak, Jr.; Hudak & Shunk Co., L.P.A.

(57) ABSTRACT

This invention relates to an optical multiple circuit breaker with (N) first optical inputs (E1) (n)), whereby these inputs can be switched optionally to (N) first or (N) second optical outputs (A1(n)) and/or (A2(n)). Light rays (LS1(n)) and LS2(n)) are reflected or transmitted from two surfaces (27, 28), to which end the at most two recesses (25) of a transparent base body (1) that form these surfaces are filled optionally with an optically thinner or denser material (26). In accordance with a first embodiment, both surfaces (27, 28) are so arranged that, in the reflecting switching state, the first inputs (E1(n)) are optically connected to the first outputs (A1(n)), and the second inputs (E2(n)) are connected to the second outputs (A2(n)), and that in the transmission switching state, the first input (E1(n)) are optically connected to the second outputs (A2(n)). Owing to low optical damping and compact structure, the above-described optical multiple circuit breakers can be used advantageously in optical communication engineering, in particular in the realization of optical bus systems.

21 Claims, 11 Drawing Sheets

OPTICAL MULTIPLE CIRCUIT BREAKER

BACKGROUND OF THE INVENTION

The invention concerns an optical multiple circuit breaker according to the preamble of claim 1.

In the field of optical information technology, optical switches are gaining importance for optional connection of optical information channels both together and with local networks and end users. In particular, there is a need for optical multiple circuit breakers of compact and simple construction which allow coupling of optical components or beam waveguides into existing beam waveguide arrangements.

Mechanical matrix switches are known in which mirrors or prisms are moved with high precision. Switches based on mirror or prism arrangements require a very stable and precise structure. The required precision is generally associated with a very high technical complexity.

As well as optical switch elements in which the micro-optical components are moved with high precision, optical switch elements are also known which work on a switch principle which does not require the movement of micro-optical components.

GB 1 494 150 describes an optical switch element in a beam waveguide in which an interface receiving incident light is switched between a state of total reflection and transmission. The known optical switches have a narrow gap in the beam waveguide core. The gap forms a flat interface between a medium with higher refractive index, i.e. the material of the beam waveguide core, and a medium of lower refractive index, i.e. a gaseous substance in the gap, so that light hitting the interface obliquely, guided along the beam waveguide, is totally reflected at the interface in the direction of an adjacent beam waveguide. To switch to the transmitting state in which the light hitting the interface retains its direction of propagation, a fluid with a refractive index which matches that of the material of the core of the beam waveguide is introduced into the gap. A storage vessel with a heating device attached to the beam waveguide provided as a device for optional introduction of the substance in its liquid or gaseous phase. By thermal expansion, the fluid is pressed into the slot penetrating through the casing layer into the core layer of the beam waveguide. In another design form, the liquid substance in the slot is brought to the gaseous phase by heating.

The complex production of the known switch is a disadvantage. Furthermore the known switch has a high optical attenuation, as the light beam emerging divergent from the beam waveguide is not guided in the area of the slot. Therefore in the transmitting switched state, part can be coupled over to the adjacent beam waveguide, which leads to a high crosstalk. Production of an optical multiple circuit breaker with several inputs and outputs required a correspondingly high number of these known switch elements and would therefore be very costly to implement.

IEEE Transactions on Components, Packaging and Manufacturing Technology-Part B, Vol. 18, No. 2, May 1995, Pages 241–244, discloses an optical multiple circuit breaker according to the preamble of claim 1.

One decisive disadvantage of this optical multiple circuit breaker is the restriction to one set of N optical inputs lying in one plane and aligned parallel to each other. There is no freedom of design with regard to the arrangement of optical inputs and outputs because of the arrangement of the recesses with reflective surfaces in one plane and their parallel alignment. Thus with this optical multiple circuit breaker, use of coupling of an optical assembly or a local glass fiber network to existing optical data lines for example is simply not possible.

Another disadvantage is the high number of switch elements. The known optical multiple circuit breaker with N optical inputs has N×N individual switch elements which must be controlled individually by robots for switching between the reflective and the transmitting switched state. Simultaneous and hence rapid switching of all switch elements is not therefore feasible.

Because of the multiplicity of the switch element arranged in one plane, the known optical multiple circuit breaker has relatively long optical path lengths so that to avoid a high optical attenuation and crosstalk, a light guide is provided by means of integral waveguides.

SUMMARY OF THE INVENTION

On the basis of the state of the art described, the task of the invention is to prepare an optical multiple circuit breaker with which optical inputs can be switched to optical outputs so that for example an optical assembly or a local glass fiber network can be coupled onto existing optical data lines without problems, and which allows a simple and hence fast switching between the reflective and transmitting switched states, and which has a compact structure and hence short optical path lengths.

The task is solved according to the invention with the features given in claim 1 and in claim 3. The dependent claims concern advantageous designs of the invention.

The optical multiple circuit breaker according to claim 1 has 2×N optical inputs E1(n) and E2(n) and 2×N optical outputs A1(n) and A2(n), where n is an index from 2 to N, with N greater than or equal to 2. By optical reflection or transmission at two surfaces, thus 2×N light beams from the 2×N optical inputs can be switched to the 2×N optical outputs. To form these two surfaces, the base body of the optical multiple circuit breaker has a maximum of two recesses. In the transmitting switched state, the recesses are filled with a substance with a refractive index corresponding approximately to that of the transparent base body material. Thus the transmission of the incident light beams from the N first optical inputs E1(n) to the N second optical outputs A2(n) is possible. In the reflective switched state, the recesses are filled with a substance with a lower refractive index. Two surfaces of the recesses are formed and arranged in the beam path so that in the reflective switched state, the first surface reflects the incident N light beams from the N first optical inputs E1(n) essentially to the N first optical outputs A1(n), whereas the second surface reflects the incident N light beams from the N second optical inputs E2(n) essentially to the N second optical outputs A2(n). Essentially the reflections are total reflections at the interface of a medium of higher refractive index, i.e. the base body, to a medium of lower refractive index, i.e. the substance of lower refractive index in the recess. At least one device fills the recesses optionally with the substance of higher or the substance of lower refractive index.

According to one design form, the two surfaces involved in the optional reflection or transmission are arranged parallel to each other so that the N second optical inputs E2(n) and the N first optical outputs A1(n) lie on opposite sides of the base body. For this the base body can have two recesses or one recess, for example with a parallelo-gram-shaped cross-section.

The optical multiple circuit breaker according to the invention according to claim 3, like the optical multiple circuit breaker in claim 1, has 2×N optical inputs E1(n) and E2(n) and 2×N optical outputs A1(n) and A2(n), where n however is an index from 1 to N with N greater than or equal to 1. By optional reflection or transmission at two surfaces formed by a maximum of two recesses in the base body, here 2×N light beams from the 2×N optical inputs are switched to the 2×N optical outputs. In comparison with the optical multiple circuit breaker according to claim 1, the base body of this switch has two additional surfaces formed and arranged in the beam path of the light beam so that in the transmitting switched state by reflection at these additional surfaces the N second optical inputs E2(n) are optically connected to the N first optical outputs A1(n). As in the optical multiple circuit breaker to claim 1, here too in the transmitting switched state the N first optical inputs E1(n) are optically connected with the N second optical outputs A2(n), and in the reflective switched state the N first and the N second optical inputs E1(n) and E2(n) are optically connected with the N first and N second optical outputs A1(n) and A2(n) respectively.

Preferably one of the two additional surfaces of the base body of the optical multiple circuit breaker to claim 3 lies opposite the N first optical outputs A1(n) and the other additional surface lies opposite the N second optical inputs E2(n).

Advantageously the two additional surfaces are arranged at an angle of 70° to 110° to each other. In the transmitting switched state, the light beams from the N second optical inputs E2(n), transmitted by the recess, are diverted by reflection at these two additional surfaces to the N first optical outputs A1(n).

The two additional surfaces can correspond to external surfaces of the base body or be formed by one or more additional recesses in the base body.

Preferably the light beams hitting these additional surfaces are totally reflected. For this, these surfaces form interfaces between a medium of higher refractive index i.e. the material of the transparent base body part, and a medium of lower refractive index, i.e. the outer environment of the base body or a substance or substance mixture of lower refractive index inside the additional recesses in the base body.

The basic advantage of the optical multiple circuit breaker according to the invention is that the two interfaces responsible for the switching process are not moved, and hence no precise movements need be performed. Due to the preferred use of collimated light beams, no costly waveguide structures are necessary to guide the beam in the base body. As the beam does not divert even in the recesses involved in the switching process, the optical multiple circuit breakers according to the invention have a low optical attenuation and low crosstalk. Because of the multiple design possibilities of the recesses, optical multiple circuit breakers can be produced with different positions of inputs and outputs and with different switching possibilities. In addition, independently of the number of optical inputs, only two optically high quality surfaces are required which are formed by only maximum two recesses. In an extremely compact and simple construction therefore with the optical multiple circuit breakers according to the invention, low-cost mass production is possible.

The use of the terms "optical input" and "optical output" in contrast to the term "optical channel" serves merely to simplify the description of the optical multiple circuit breaker. Because of the reversibility of the light paths, use is possible in both directions of radiation, i.e. bi-directionally.

Preferably the optical multiple circuit breaker according to the invention is operated with free beams, i.e. light beams not guided in waveguide structures. This can for example be achieved if the light brought by means of beam waveguides is collimated or focused before the inlet to the switch itself. In principle however it is also conceivable to include in the optical multiple circuit breaker integrated optical structures to guide light, for example by means of layer or trough waveguide structures, which however requires a more complex construction of the base body.

The position of the optical inputs and outputs in the optical multiple circuit breakers is not firmly specified. For N greater than or equal to 2, an arrangement is preferred in which the N first incident light beams LS1(n) do not lie in one plane with the N second incident light beams LS2(n). Here in each case an approximately parallel arrangement of the N first and an approximately parallel arrangement of the N second optical inputs is preferred. The resulting planes of incident light beams and planes of emerging light beams can be arranged in many ways to each other depending on the geometry of the optical multiple circuit breaker used. Here preferably the optical inputs E1(n) and E2(n) are arranged such that the plane of the N first incident light beams LS1(n) lies at an angle of 70° to 110° to the plane of the N second incident light beams LS2(n). Advantageously here the recesses are arranged such that the angle of incidence of the light beams on a surface of a recess is around 40°, to 50°. The position of the outputs to the inputs is specified by the circumstance that the light beams transmitted from the N first optical inputs E1(n) fall on the same N second optical outputs A1(n) as the light beams reflected in the reflected switched state from the N second optical inputs E2(n).

As a result advantageously these optical multiple circuit breakers can be used in the area of optical information technology, in particular for optional connection or decoupling of optical information channels and for coupling of optical components into existing optical connections. Because of the possible rectangular arrangement of the N second optical inputs E2(n) to the N first optical inputs E1(n) for N common outputs A2(n) or also 2N common outputs A2(n) and A1(n), with the multiple switches according to the invention, in the same way as the bus systems known in micro-electronics, compact optical bus systems can be produced with orthogonal arrangements of plug cards and boards.

In a first design form of the optical multiple circuit breaker, two recesses are provided in the base body for optional reflection or transmission of light. The surfaces formed by these recesses involved in reflection lie in a preferred arrangement at an angle of approximately 70° to 110° to each other. However other arrangements of these surfaces to each other are conceivable.

Also with the geometry of the cross-section of a recess in the plane of the beam path of a light beam, many designs are possible depending on the method of desired beam guide and the production process used. In the two simplest cases, the cross-section essentially takes the form of a rectangle or triangle.

In a second preferred design form of the optical multiple circuit breaker, only one recess is contained in the base body which forms the two surfaces on which light is either reflected or transmitted. In a preferred design form, these two surfaces lie at an angle of approximately 70° to 110° to each other. Here too however other arrangements of these surfaces to each other are conceivable. Examples of cross-section geometries of the recess are a triangular and a trapezoid cross-section. If the recess is formed by a gap, for example a V-shaped or trough-shaped cross-section of the recess is possible.

Preferably in the approximately orthogonal arrangement of the reflective surfaces, the N second optical inputs E2(n) and the N first optical outputs A1(n) lie on the same side of the base body.

The base body with which the optical multiple circuit breaker according to the invention is achieved ran consist of one or more parts, where the recesses are advantageously closed at their ends preferably by cover plates.

Surfaces at which reflections occur should, to avoid scatter, have a sufficiently high optical quality. Surfaces through which light is merely transmitted need not have a high optical surface quality as in the transmitting switched state they are in contact with the substance of higher refractive index.

The base body should, at least in the beam path, consist of a material transparent in the wavelength range used. It can be made from just one or from various transparent materials. Suitable materials may for example be transparent polymers such as where applicable fluoridated polymethylmethacrylate (PMAA), glass or transparent materials produced in a sol-gel process.

As well as the recesses described, the base body can also have one or more further recesses. These can be formed and also structured so that they are suitable to receive and hold individual beam waveguides or waveguides grouped into fiber bundles. In addition advantageously devices can be integrated to hold fiber plugs to allow simple connection with the optical input and output beam waveguides.

Such additional recesses can also hold in the base body optical elements such as spherical lenses, microlenses, GRIN lenses and/or cylindrical lenses, for collimation and/or focusing in particular of the light beams emerging divergent from the beam waveguides. It is also conceivable to hold for example linear microlens fields for bundling of light beams of several optical channels.

It is however also conceivable to form one or more additional recesses and arrange these in the beam path so that light beams penetrating these are bundled. As well as the shape of these recesses, by varying the ratio of refractive indices between the transparent base body part and the substance or substance mixture inside these additional recesses, the optical properties of these recesses serving as optical components can be adjusted.

In addition, the two surfaces of the recess or the two recesses via which optional transmission or reflection is achieved, and/or the two additional surfaces of the base body can be formed, for example as a cylindrical lens or microlons array, such that in the reflective switched state light is reflected and bundled. It is also conceivable to set the refractive index of the substance of higher refractive index in relation to the refractive index of the transparent base body material and to form the recess or recesses so that the transmitted light is bundled.

The substance or substance mixture of lower refractive index present in the recess or two recesses in the reflective switched state can for example be an inert gas such as argon or even air. The substance of higher refractive index can be a fluid or fluid mixture. Thus to adapt the refractive index to PMMA, a mixture of decalin and tetralin is suitable. As a substance with lower refractive index, a fluid which preferably does not mix with the substance of higher refractive index could also be used.

It may be advantageous, at least for the surfaces of the recesses involved in reflection, to subject these to additional treatment, for example chemical or plasma-chemical, or coat these with one or more suitable materials in order to change their wettability. In this connection, a fine structuring of the relevant surfaces can be advantageous.

As a device for optional filling of the recess involved in reflection and transmission, a fluid reservoir of variable volume can be provided, connected with the recess and located for example outside this. A force acting on the fluid reservoir from the outside, for example an electric piezo element, a thermoelectric element or an electromagnetic arrangement, now presses the substance of higher refractive index or substance of lower refractive index into the recess, whereby the optical multiple circuit breaker is switched to the transmitting or reflective switched state. If two recesses are used for optional reflection or transmission, these can have one filling device each or a common filling device connected with these.

In another design form, the substance with higher refractive index enters the recess concerned due to the thermal expansion or contraction accompanying the heating or cooling of the substance with higher and/or the substance with lower refractive index respectively. For this the device has at least one switchable heating element and/or cooling element in contact with the substance with lower and/or higher refractive index.

In a further design form, at least one micropump is provided for optional evacuation or filling of the recess.

The device for filling or evacuation of the recess with a substance with lower or higher refractive index can be fitted in the base body or outside the base body.

At least parts of the base body and/or filling device can advantageously be produced with microtechnical processes, for example the LGA process.

Several design examples of the invention are described in more detail below with reference to the drawings.

DETAILED DESCRIPTION OF THE INVENTION

Figure 1A:
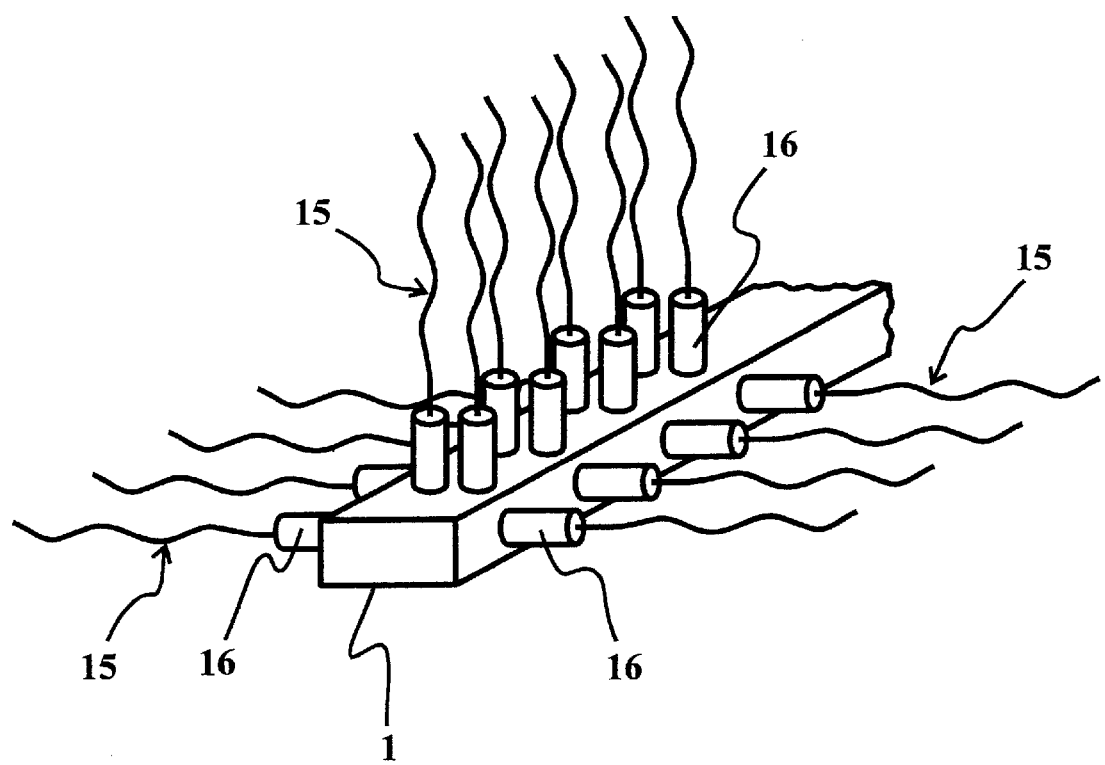
FIG. 1a is an optical multiple circuit breaker with beam waveguides coupled via GRIN lenses in perspective view.

FIG. 1a shows in diagrammatic perspective view an optical multiple circuit breaker according to the invention with beam waveguides 15 coupled via GRIN lenses 16. In the section shown, 4×4 beam waveguides for example glass fibers can be seen, coupled via GRIN lenses 16 to collimate the light beams at the bass body 1. Instead of the individual beam waveguides shown here, fiber bundles could also be coupled to the optical multiple circuit breaker for example via plug connectors. Not shown are a recess extending through the base body 1 and a device for optional filling of the recess with a substance with higher or a substance with lower refractive index. Beam waveguides lying opposite each other are connected together in the transmitting switched state. Beam waveguides standing perpendicular to each other are connected together in the reflective switch state.

Figure 1B:
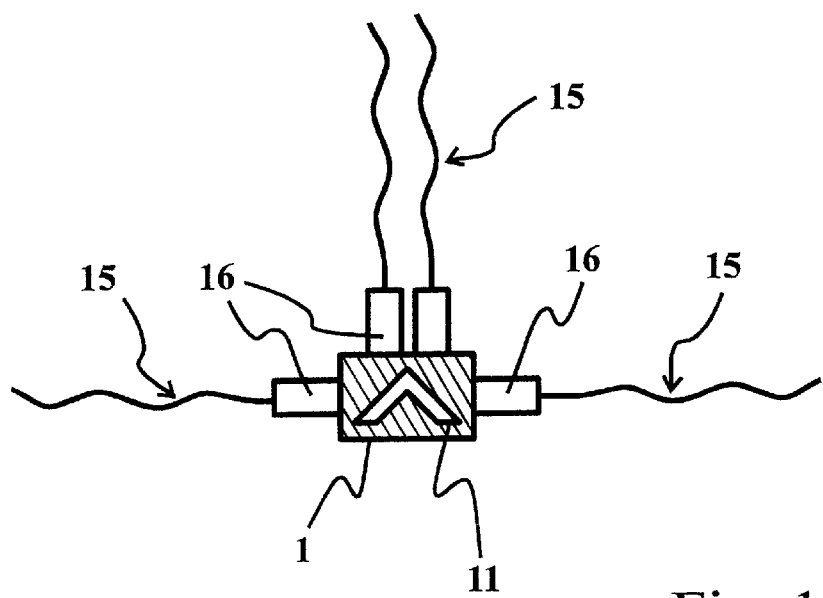
FIG. 1b is a section through the optical multiple circuit breaker in FIG. 1 a with a V-shaped recess.

FIG. 1b shows a section through the multiple switch according to FIG. 1a with two opposite beam waveguides and two beam waveguides standing perpendicular to these. Inside the base body 1 is a V-shaped recess 11 extending through the entire base body.

Figure 2A:
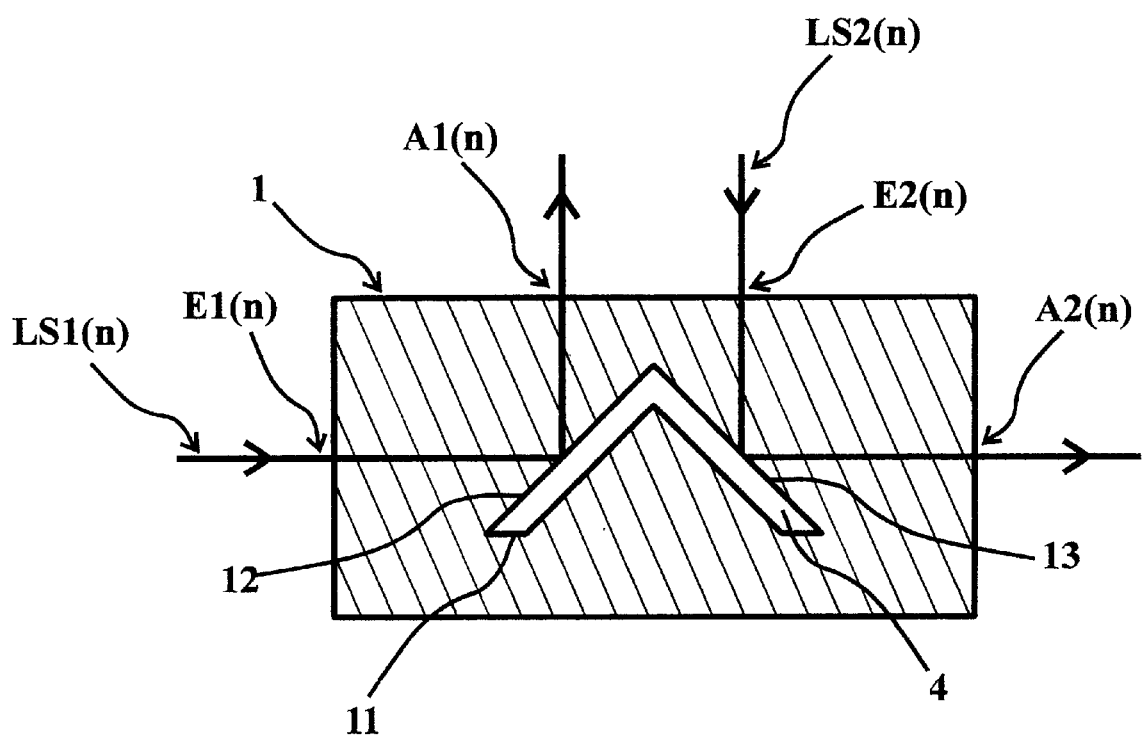
FIG. 2a is a section corresponding to FIG. 1b together with the beam path in the reflective switched state.

FIG. 2a shows the beam path in an optical multiple circuit breaker as shown in FIG. 1b in the reflective switched state. An incident light beam LS1(n) from input E1(n) strikes at an angle of approximately 45° the surface 12 formed by a V-shaped recess 11. As the inside of the recess 11 of the transparent base body 1 contains a substance of lower refractive index 4, for example air, the incident light beam LS1(n) is totally reflected in the direction of the optical output A1(n). At the same time, the incident light beam LS2(n) from input E2(n) is totally reflected at the surface 13 in the direction of output A2(n). In an optical multiple circuit breaker, several such inputs and outputs can be arranged next to each other as shown in FIG. 1a with 2×4 parallel optical inputs and 2×4 parallel optical outputs. The incident light beams LS1(n) and LS2(n) each lie in one plane, where the two planes lie at an angle of 90° to each other.

Figure 2B:
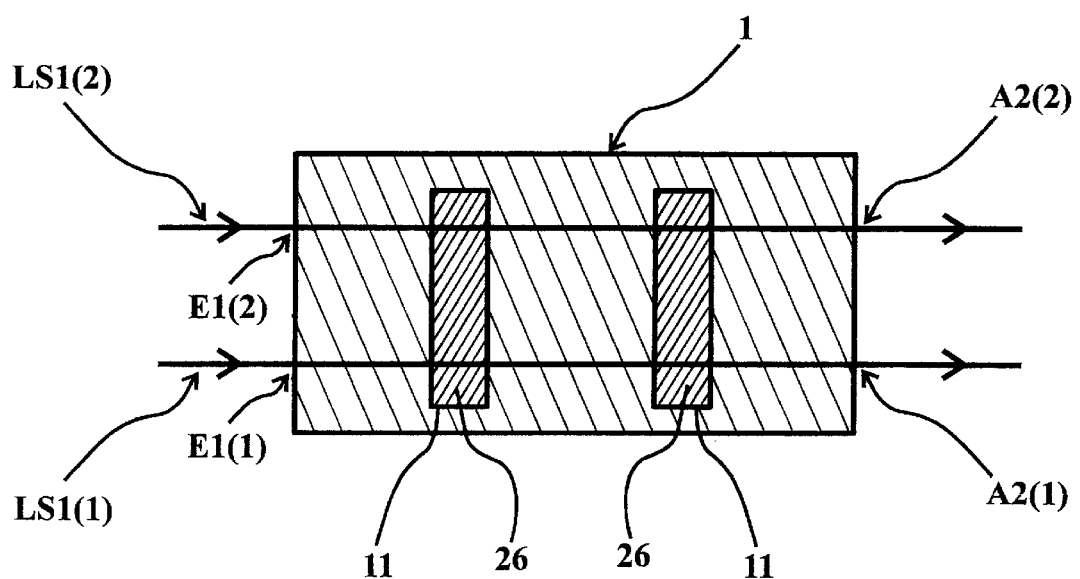
FIG. 2b is a section through the optical multiple circuit breaker according to FIG. 2a in the plane of two incident light beams in the transmitting switched state.

The transmitting switched state of an optical multiple circuit breaker according to FIG. 2a with 2×2 parallel optical inputs and 2×2 parallel optical outputs is shown in FIG. 2b in the plane of the incident parallel light beams LS1(1) and LS1(2). The two light beams penetrate through the recess 11 filled with a substance 26 of higher refractive index. The parallel optical inputs E1(1) and E1(2) are connected with the parallel optical out puts A2(1) and A2(2). Not shown are the two parallel optical outputs A1(1) and A1(2) and the two parallel optical inputs E2(1) and E2(2) which lie perpendicular to the plane shown.

Figure 3:
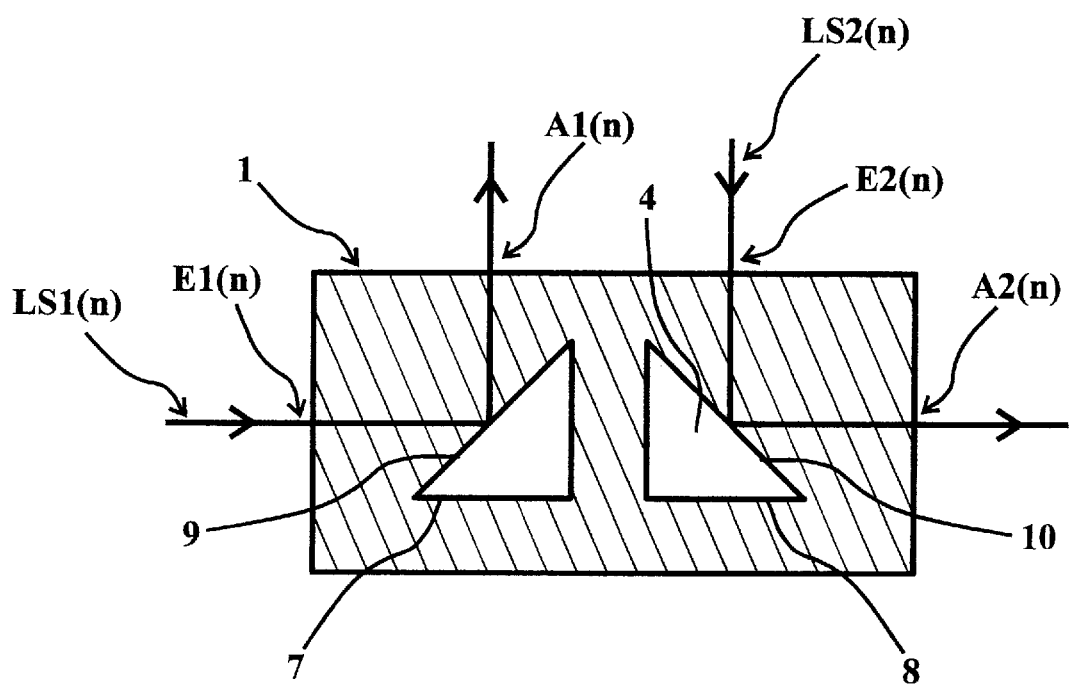
FIG. 3 is a section through an optical multiple circuit breaker with two recesses, the reflective surfaces of which stand at approximately right angles to each other in the reflective switched state.

The optical multiple circuit breaker to FIG. 2a can also be produced with two triangular recesses 7, 8 in the base body 1 (FIG. 3). The surfaces 9 and IO formed by the recesses 7, 8 lie at approximately right angles to each other. In the reflective switched state shown here, the two recesses 7, 8 contain a substance 4 of lower refractive index so that the inputs E1(n) and E2(n) are connected with the outputs A1(n) and A2(n) respectively.

Figure 4:
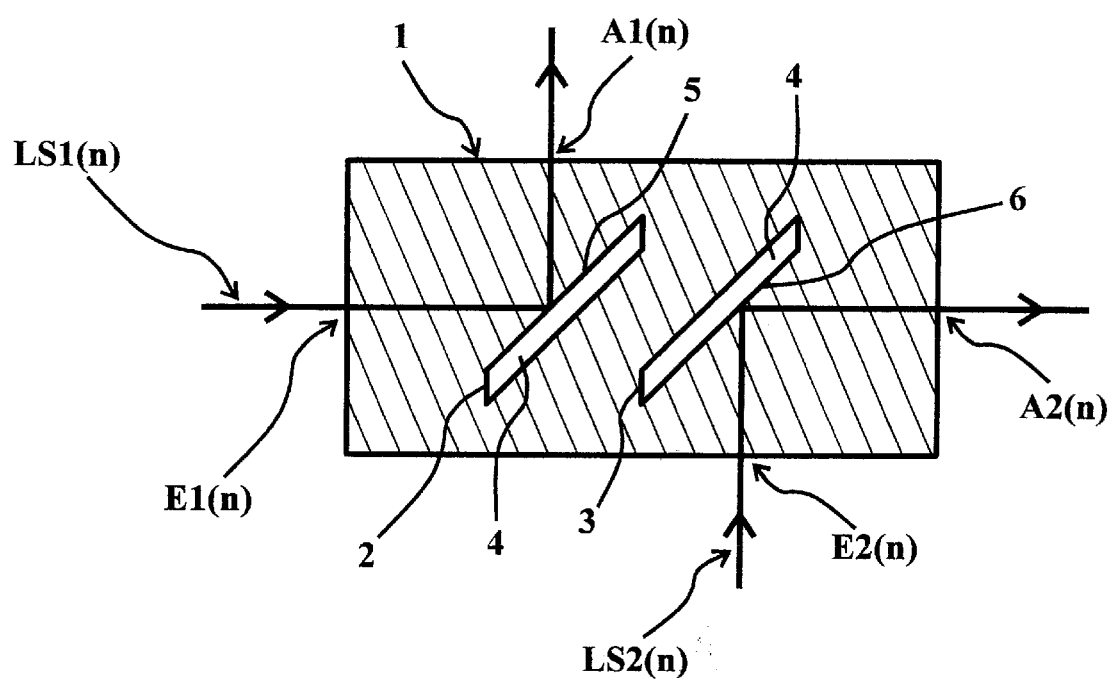
FIG. 4 is a section through an optical multiple circuit breaker with two recesses, the reflective surfaces of which are arranged parallel to each other in the reflective switched state.

In FIG. 4, the surfaces 5, 6 formed by the rectangular recesses 2, 3 lie approximately parallel to each other, whereby the input E2(n) and the output A1(n) lie on opposite sides of the base body 1.

Figure 5:
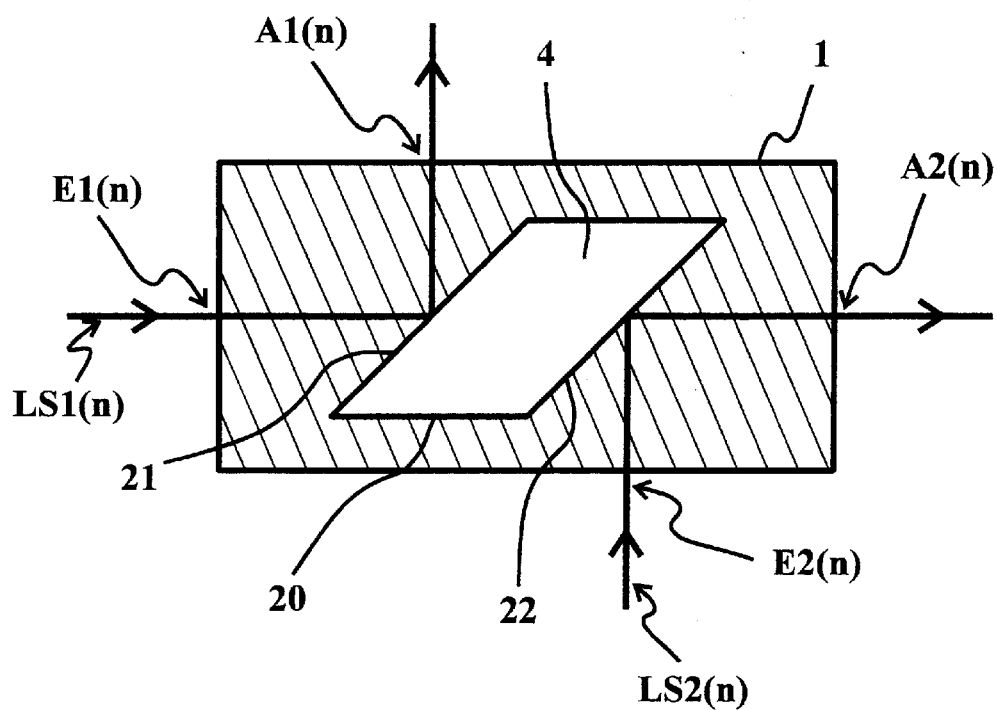
FIG. 5 is a section through an optical multiple circuit breaker with one parallelogram-shaped recess in the reflective switched state.

The multiple switch according to FIG. 4 can also be produced while retaining its functionality with just one parallelogram-shaped recess as shown in FIG. 5. Here the two reflective surfaces 21, 22 are formed by one recess 20.

Figure 6:
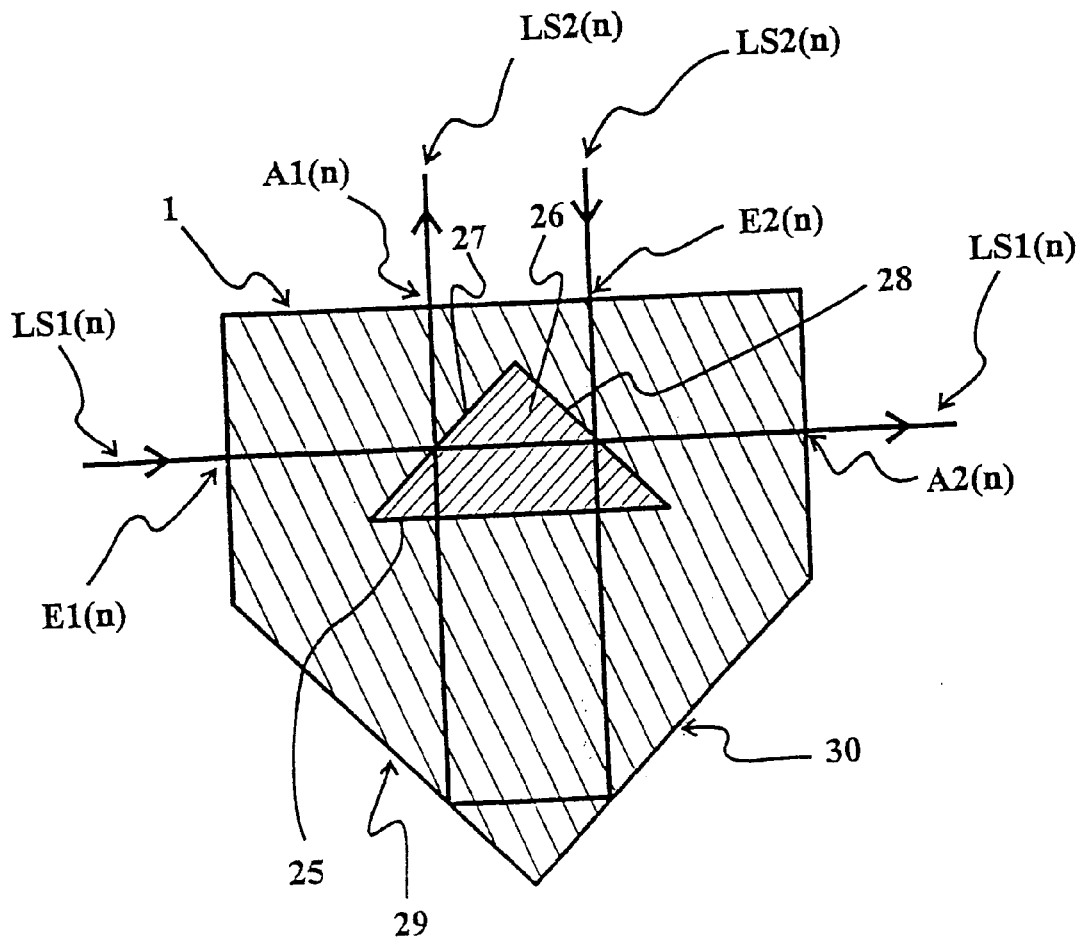
FIG. 6 is a section through an optical multiple circuit breaker with one recess and two additional reflective surfaces on the base body in the transmitting switched state.

FIG. 6 shows an optical multiple circuit breaker with a triangular recess 25 and two additional reflective surfaces 29, 30 at base body 1. The surface 30 lies opposite the in puts E1(n) and the surface 29 opposite the outputs A1(n). In the transmitting switched state shown, the light beam LS1(N) is not deflected by the side surfaces 27 and 28 of recess 25 as the recess 25 is filled with a substance 26 of higher refractive index, corresponding approximately to the refractive index of the material of base body 1. The incident light beam L52(n) from input F2(n) penetrates through the recess 25 undeflected and, after two total reflections at the surfaces 30 and 29 of the base body 1, hits the optical output A1(n).

In the reflective switched state, the optical multiple circuit breaker according to FIG. 6 has the same functionality as the switch shown in FIG. 2a. If namely the recess 25 is filled with a substance of lower refractive index, via total reflection at surfaces 27 and 28 the optical inputs E1(n) and E2(n) are optically connected with optical outputs A1(n) and A2(n) respectively.

The additional surfaces 29, 30 lying at an angle of 90° to each other can, as in this example, correspond to two outer surfaces of base body 1 or be formed by one or more additional recesses of the base body filled with a substance of lower refractive index than the bass body.

Because of the perpendicular arrangement of the optical inputs E2(n) and the optical outputs A1(n) to the optical inputs E1(n) and optical outputs A2(n), the optical multiple circuit breaker according to FIG. 6 allows simple creation of an optical bus system similar to the bus systems known in communications technology with plug cards and plug boards arranged perpendicular to the electrical conductor paths.

Figure 7A:
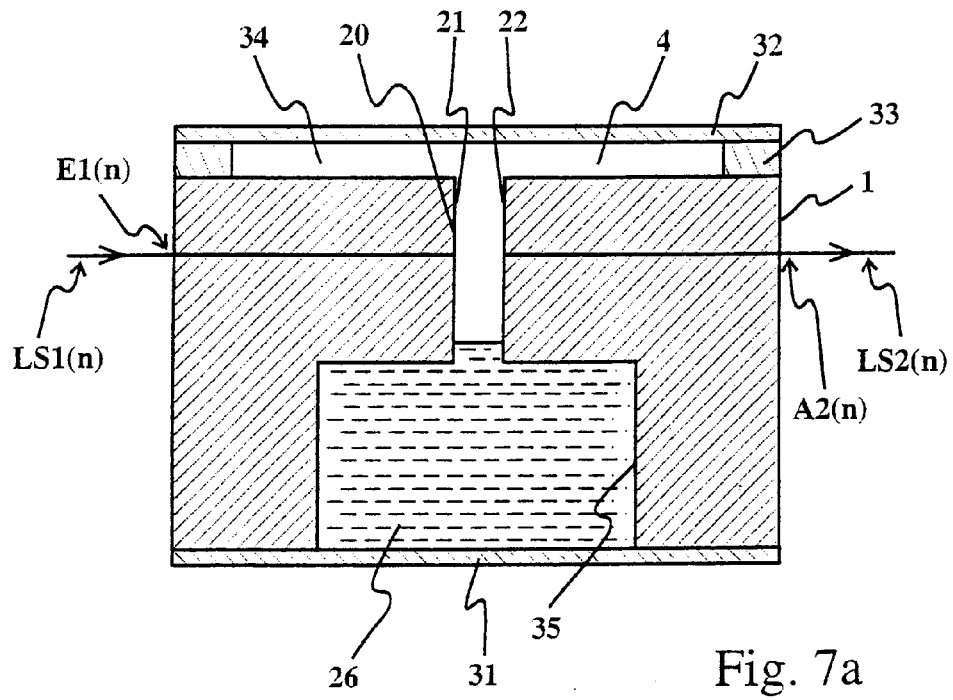
FIG. 7a is a section perpendicular to the out plane of the optical multiple circuit breaker shown in FIG. 5 in the reflective switched state, with a device for filling the recess.

FIG. 7a shows a section through an optical multiple circuit breaker, for example according to FIG. 5, along the incident light beam LS1(n) and perpendicular to the cut plane shown in FIG. 5. In the reflective switched state shown, the recess 20 is filled in the area of the beam path with the substance 4 of lower refractive index. The incident light beam from input E1(n) is reflected at surface 21. The reflected beam and the incident light beam from input E2(n) lie approximately perpendicular to the cut plane. The light beam LS2(n) reflected at surface 22 hits output A2(n). Connected with the recess 20 are a chamber 35 filled with a substance 26 of higher refractive index and a cavity 34. The chamber 35 in bass body 1 is closed to the outside by a membrane 31. The cavity 34 is closed by a membrane 32 attached to spacers 33.

Figure 7B:
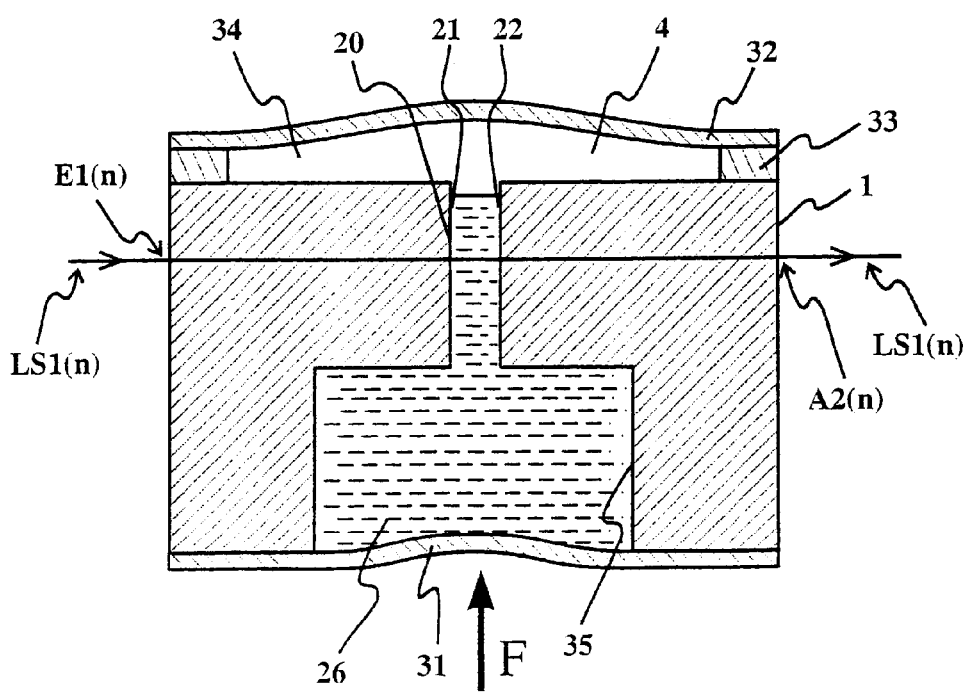
FIG. 7b is the optical multiple circuit breaker according to FIG. 7a in the transmitting state.
Figure 8:
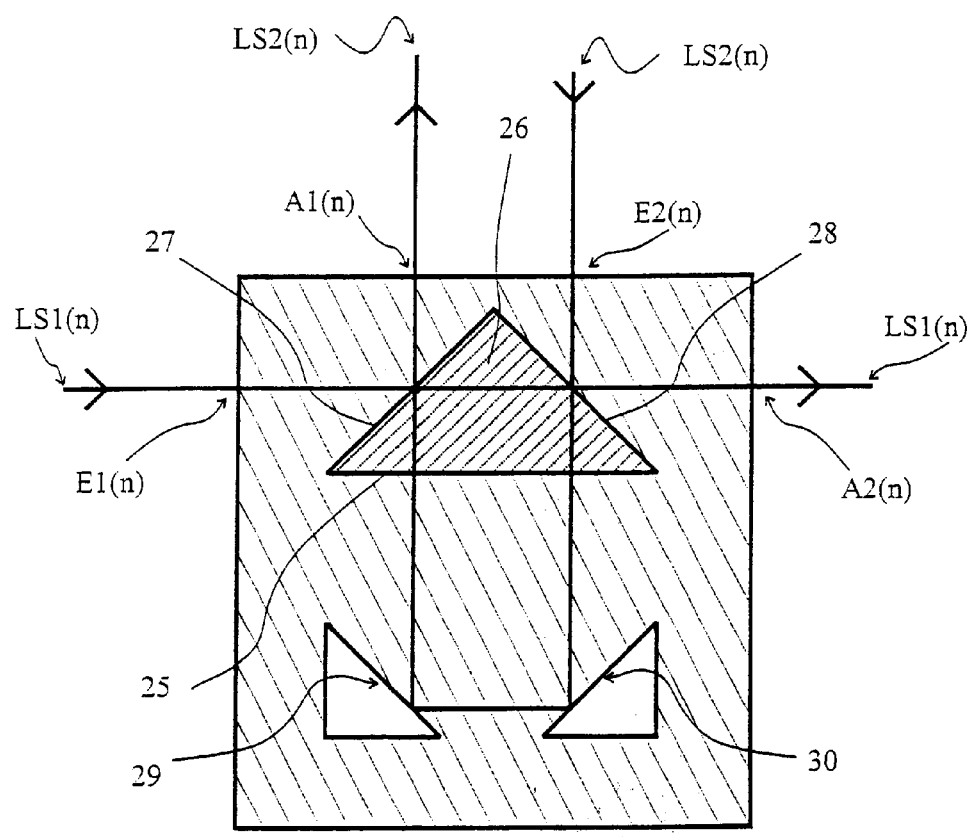
FIG. 8 is a section through an optical multiple circuit breaker with an additional recess of the base body filled with a substance of lower refractive index to form reflective surfaces.
Figure 9:
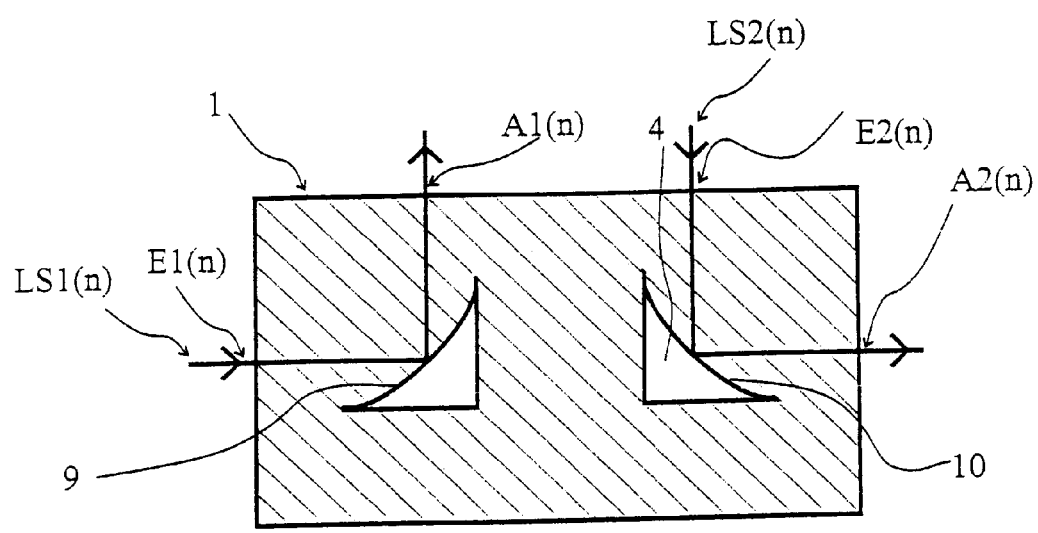
FIG. 9 is a section through an optical multiple circuit breaker with a recess for partly bundling incident light.
Figure 10:
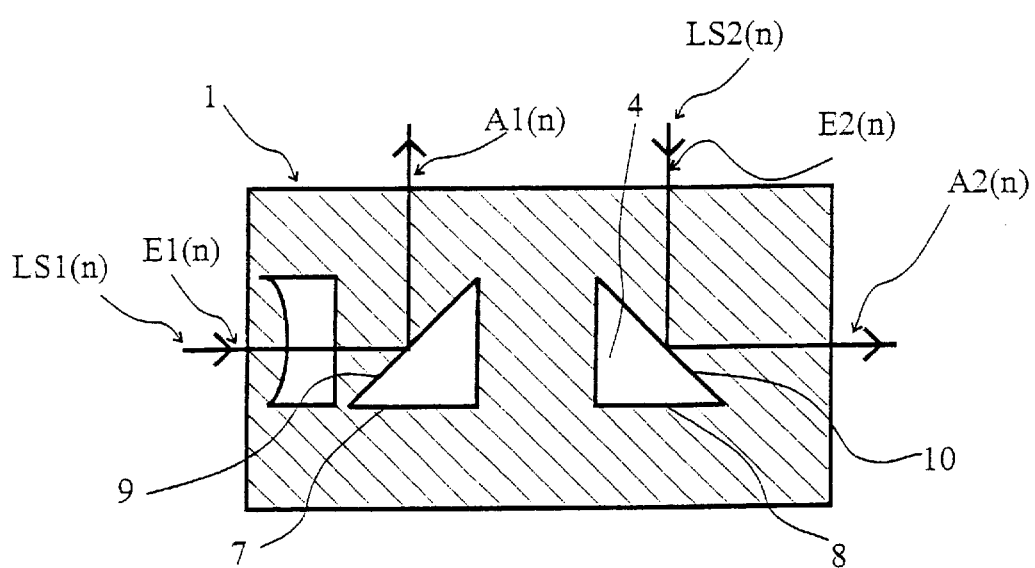
FIG. 10 is a section through an optical multiple circuit breaker with a recess for bundling light beams striking the recess.

By the effect of an external force F on membrane 31, the volume of chamber 35 is reduced whereby the substance 26 of higher refractive index, a fluid, is pressed into the recess 20. Corresponding to the reduction in volume of chamber 35, the volume of cavity 34 can expand by an expansion of membrane 32. If the substance 4 of lower refractive index is a gas, due to its compressibility it is also conceivable, instead of membrane 32, to provide a rigid closure to cavity 34. The resulting transmitting switched state in which the optical input E1(n) is connected with the optical output A2(n) is shown in FIG. 7b. The force F acting on the membrane 31 can be provoked for example by an electromagnetic or piezo electrical activation device. A thermoelectrical device for example by means of a bimetallic arrangement is also conceivable.

What is claimed is:

1. Optical multiple circuit breaker which has N first optical inputs (E1(n)) that can be alternatively connected to N first optical outputs (A1(n)) or to N second optical outputs (A2(n)), which has a base body which is transparent at least in the area of the beam paths, and which has recesses alternatively for reflection or transmission of light, in which, when the recesses are filled with at least one substance having a refractive index lower than that of the transparent material of the base body, the incident N beams of light are totally reflected by surfaces of the recesses, and in which, when the recesses are filled with at least one substance having a refractive index approximately equal to that of the transparent material of the base body, the incident N light beams penetrate through the recesses, and which has at least one device that, when switched to the reflecting state, fills the recesses with the substance having a lower refractive index or else, when switched to the transmitting state, fills the recesses with the substance having a higher refractive index, wherein the optical multiple circuit breaker also has N second optical inputs (E2(n)), and that N is greater than or equal to 2, and that the base body has at most 2 recesses alternatively for reflection or transmission of light, in which two surfaces of the recesses are so formed and so arranged in the path of the incident (2×N) beams of light that in the reflecting state, the N first and the N second optical inputs (E1(n) and E2(n)) are optically connected with the N first and N second optical outputs (A1(n) and A2(n)), respectively, and in the transmitting state, the N first optical inputs (E1(n)) are optically connected with the N second optical outputs (A2(n)), and wherein the N first optical inputs (E1(n)) and the N second optical inputs (E2(n)) are arranged such that the plane of the N first incident beams of light (LS1(n)) lies at an angle of 70° to 110° to the plane of the N second incident beams of light (LS2(n)).

2. Optical multiple circuit breaker according to claim 1, wherein the two surfaces of the recesses, or of the recess, on which the incident beams of light are totally reflected in the reflecting state are arranged parallel to each other.

3. Optical multiple circuit breaker according to claim 1, wherein the base body has precisely two recesses alternatively for reflection or transmission of light.

4. Optical multiple circuit breaker according to claim 3, wherein the two surfaces of the recesses, on which the incident light beams are totally reflected in the reflecting state, are arranged at an angle of 70° to 110° to each other.

5. Optical multiple circuit breaker according to claim 1, wherein the base body has exactly one recess alternatively for reflection or transmission of light.

6. Optical multiple circuit breaker according to claim 5, wherein the two surfaces of the recess, on which the incident light beams are totally reflected in the switched state, are arranged at an angle of 70° to 110° to each other.

7. Optical multiple circuit breaker according to claim 1, wherein at least one of the reflecting surfaces is formed such that incident light is at least partly bundled by reflection at this surface.

8. Optical multiple circuit breaker according to claim 1, wherein the base body has at least one additional recess to receive and hold waveguides.

9. Optical multiple circuit breaker according to claim 8, wherein said waveguides are individual or bundled glass fibers or plastic fibers, or fiber plugs.

10. Optical multiple circuit breaker according to claim 1, wherein the base body has at least one additional recess to receive and hold micro-optical elements.

11. Optical multiple circuit breaker according to claim 10, wherein said microoptical elements are micro-lenses or GRIN lenses.

12. Optical multiple circuit breaker according to claim 1, wherein the base body has, in the beam path, at least one additional recess formed such that light beams striking this recess are transmitted bundled.

13. Optical multiple circuit breaker according to claim 1, wherein the base body has integrated optical waveguide structures.

14. Optical multiple circuit breaker according to claim 1, wherein the recesses are connected with at least one chamber of variable volume, which is filled at least partly with the substance of higher refractive index, and in that to switch from the reflective to the transmitting state the volume of the chamber is reduced by at least one electromagnetically, thermoelectrically or piezoelectrically driven device whereby the substance of higher refractive index is pressed into the recesses.

15. Optical multiple circuit breaker according to claim 1, wherein the device provided for the optional filling of the recesses involved in the reflection or transmission has at least one micropump connected with the recesses.

16. Optical multiple circuit breaker according to claim 1, wherein the device provided for optional filling of the recesses involved in the reflection or transmission has at least one switch-selected heating element and/or cooling element in contact with the substance of lower refractive index and/or the substance of higher refractive index.

17. An optical bus system comprising the optical multiple circuit breakers according to claim 1.

18. Optical multiple circuit breaker which has N first optical inputs (E1(n)) that can be alternatively connected to N first optical outputs (A1(n)) or to N second optical outputs (A2(n)), which has a base body which is transparent at least in the area of the beam paths, and which has recesses alternatively for reflection or transmission of light, in which, when the recesses are filled with at least one substance having a refractive index lower than that of the transparent material of the base body, the incident N beams of light are totally reflected by surfaces of the recesses, and in which, when the recesses are filled with at least one substance having a refractive index approximately equal to that of the transparent material of the base body, the incident N beams of light penetrate through the recesses, and which has at least one device that, when switched to the reflecting state, fills the recesses with the substance of lower refractive index or else, when switched to the transmitting state, fills the recesses with the substance of higher refractive index, wherein the optical multiple circuit breaker also has N second optical inputs (E2(n)), and that N is greater than or equal to 2, and that the base body has at most 2 recesses alternatively for reflection or transmission of light, and that two surfaces of the base body and two surfaces of the recesses are so formed and so arranged in the path of the incident (2×N) light beams that in the reflecting state, the N first and the N second optical inputs (E1(n) and E2(n)) are optically connected with the N first and N second optical outputs (A1(n) and A2(n)), respectively, and in the transmitting state, the N first and the N second optical inputs (E1(n) and E2(n)) are optically connected with the N second and N first optical outputs (A1(n) and A2(n)), respectively, and wherein the N first optical inputs (E1(n)) and the N second optical inputs (E2(n)) are arranged such that the plane of the N first incident beams of light (LS1(n)) lies at an angle of 70° to 110° to the plane of the N second incident beams of light (LS2(n)).

19. Optical multiple circuit breaker according to claim 18, wherein of the two surfaces of the base body, one surface lies opposite the N first optical outputs (A1(n)) and one surface lies opposite the N second optical inputs (E2(n)).

20. Optical multiple circuit breaker according to claim 19, wherein the two surfaces of the base body which lie opposite the outputs (A1(n)) and opposite the inputs (E2(n)), respectively, are arranged at an angle of 70° to 110° to each other.

21. Optical multiple circuit breaker according to claim 18, wherein the two surfaces of the base body are formed by at least one additional recess in the base body.

* * * * *